United States Patent [19]

Seguin

[11] 4,419,711
[45] Dec. 6, 1983

[54] METHOD AND APPARATUS FOR THE PROTECTION OF ELECTRICAL EQUIPMENT FROM HIGH VOLTAGE TRANSIENTS

[76] Inventor: Herb J. J. Seguin, 7840-44th Ave., Edmonton, Alberta, Canada, P6K 0Z1

[21] Appl. No.: 280,366

[22] Filed: Jul. 6, 1981

Related U.S. Application Data

[63] Continuation-in-part of Ser. No. 108,215, Dec. 28, 1979, Pat. No. 4,328,523.

[51] Int. Cl.³ .............................................. H02H 3/20
[52] U.S. Cl. ...................................... 361/111; 361/56; 361/91; 333/12
[58] Field of Search ...................... 361/1, 56, 91, 111, 361/110, 334, 385, 126, 54, 33; 333/12, 181; 174/52 R, 52 H, 55 G, 6, 7

[56] References Cited

U.S. PATENT DOCUMENTS

| | | | |
|---|---|---|---|
| 3,129,396 | 4/1964 | Germain et al. | 174/52 R X |
| 3,332,000 | 7/1967 | Greening et al. | 361/56 X |
| 3,518,489 | 6/1970 | Musham | 361/56 |
| 3,538,382 | 11/1970 | Smith, Jr. | 361/56 |
| 3,564,386 | 2/1971 | Leonard | 361/385 X |
| 3,660,719 | 5/1972 | Grenier | 361/56 |
| 3,793,535 | 2/1974 | Chowdhuri | 361/56 X |
| 3,824,431 | 7/1974 | Schlicke | 361/126 |
| 4,105,007 | 8/1978 | Mochimaru | 333/12 X |
| 4,242,712 | 12/1980 | Doll | 361/42 |
| 4,328,523 | 5/1982 | Seguin | 361/111 X |

Primary Examiner—Patrick R. Salce
Attorney, Agent, or Firm—Sixbey, Friedman & Leedom

[57] ABSTRACT

This invention provides a high voltage transient protection unit comprising a recoverable spark gap, an L-C filter, a voltage variable resistor and provision for specified ground connection of these elements; and a method of protecting electrical equipment from damage due to a high voltage transient comprising directing any transient above a predetermined minimum voltage level through a recoverable spark gap to a first grounding circuit; delaying said transient for a sufficient time to allow said spark gap to fire and filtering out through a separate grounding circuit that portion of a transient below said predetermined minimum level and above a predetermined maximum voltage level.

36 Claims, 22 Drawing Figures

$L_1$ = stator inductance $\simeq 2.04$ mh $L_2$ = rotor inductance $\simeq 3.45$ mh $L_M$ = magnetizing inductance $\simeq 61$ mh $R_2$ = real part of motor impedance $\simeq 10\,\Omega$ at full load $C_f = C_1 + C_{line}$
$R_l = R_{line} + R_M$

METHOD AND APPARATUS FOR THE PROTECTION OF ELECTRICAL EQUIPMENT FROM HIGH VOLTAGE TRANSIENTS

CROSS-REFERENCE TO RELATED APPLICATION

This application is a continuation-in-part of copending application Ser. No. 108,215 filed Dec. 28, 1979, now U.S. Pat. No. 4,328,523.

BACKGROUND OF THE INVENTION

This application relates to a method and apparatus for the protection of electrical equipment from high voltage transients.

The sudden failure or gradual step by step deterioration of electrical equipment due to high voltage transients or surges stemming from natural or man made occurrences has long been recognized as a serious problem in the electrical industry. The literature has reported many investigations of transient voltage occurrences on a wide variety of power distribution systems, both residential and commercial. These studies have shown that voltage spikes of 6 KV or more are not uncommon on residential lines with voltage surges of 100 KV or more in many high power industrial systems. An even worse situation is reported for remote rural power distribution systems of the type normally used to supply electric power to oil fields. Specifically, the down hole pump motors and their associated feeder cables, which are often used at these remote pumping sites are particularly susceptible to electrical failure. Transients generated from such factors as lightning, line switching or full voltage starting can easily damage the down hole motor and/or its very long feeder cable, since the installation is usually heavily grounded to earth through either direct contact with the metallic well casing or conduction through low impedance salt water in the well bore. Moreover these pump motor and feeder cable systems may be damaged not only by high transient voltage levels but also by high rates of rise of voltage.

Experience has shown that in such circumstances motor and/or feeder cable failure becomes a very common occurrence, leading to expensive shut down time and replacement. Consequently an effective and economic method of surge and transient protection is urgently required for installations such as these. The present invention offers a solution to this problem. It should be noted, however, that the device would be effective in many similar applications where transients can degrade or damage power transmission or other associated equipment.

PRIOR ART

Surge or transient suppressors are by no means new devices, since they have been used in the electrical industry for many years. The communications industry in particular has of necessity utilized transient suppression gear on equipment from the outset because of the delicate nature of electronic hardware in general. Power utilities have also, but to a much lesser degree, incorporated various forms of lightning arrestors in their distribution systems, particularly newer ones. However, whereas these lightning arrestors have in general provided adequate protection of the power companies' equipment, they have often been ineffective in providing transient protection for the subscriber; especially under circumstances previously outlined herein.

Conventional methods of protection usually consist of providing a station class lightning arrestor in combination with a separate surge compacitor mounted in close proximity to the motor terminals (usually not more than 50 feet away). This method, though effective in most industrial motor installations, does not provide adequate protection for submergible oil well pump installations, due primarily to the long feeder cable, severe down hole space and environmental conditions, and the complex nature of the motor load impedance.

U.S. Pat. No. 3,824,431, issued to Schlicke illustrates a system applicable to the surge protection of communication transmission lines. U.S. Pat. No. 408,483 issued to Golde et al. relates to a similar type of surge protection as the present invention. In both cases, use is made of some elements utilized in the present case. As such, the patents are typical of the prior art.

U.S. Pat. No. 3,795,535, issued to Chowdhuri provides a surge protection device for the protection of semiconductor devices from transient voltage surges. This device as described by Chowdhuri is of limited application apart from the semiconductor use to which it is specifically directed and, in particular, is totally inadequate, as described, to deal with protection of a complex variable impedance load such as a submergible pump motor.

The present invention differs significantly from these and all other suppressor systems of which the applicant is aware.

SUMMARY OF THE INVENTION

Among the problems with the prior art is that no system is available which provides a combination of elements which will co-operate to dissipate the enormous energy associated, for example, with lightning surges, provide a time delay for the commutation period of the lightning arrestor and provide protection against energy leakage through the foregoing two elements. The unit of the present invention provides a combination of elements which interact to provide protection over this range of occurrences, particularly in cases where a complex variable impedance load is to be protected.

It is an object of the present invention to provide a method and apparatus for the protection of electrical equipment from high voltage transients.

It is a further object of the invention to provide a high voltage transient protection unit for down hole submergible pump motors.

It is a further object of the invention to provide a method of protecting down hole submergible pump motors against high voltage transients.

Thus the invention in its broad aspect provides a high voltage transient protection unit comprising, in order, a recoverable spark gap, an L-C filter, a voltage variable resistor, a first means for connecting said recoverable spark gap to a first grounding circuit and a second means for connecting said filter and said voltage variable resistor to a separate and distinct grounding circuit.

There is further provided a method of protecting electrical equipment from damage due to high voltage transients comprising directing any transient above a predetermined minimum voltage level through a recoverable spark gap to a first grounding circuit, delaying said transient for a sufficient time to allow said spark gap to fire, and filtering out through a second separate grounding circuit that portion of said transient below said predetermined minimum level and above a predetermined maximum voltage level.

The basic concept utilized in the design and development of this new surge suppressor incorporates a 3 stage approach in transient elimination. Thus whereas the individual elements used in the construction of the suppressor are not in themselves new it is the appropriate utilization and interaction of each stage that is of primary importance in proper overall device operation.

Basically only 3 different elements for passive high power transient dissipation have been used. These are:
(1) Recoverable spark gaps
(2) L-C filters
(3) Voltage variable resistors (Varistors).

Each of the above devices possesses unique characteristics which gives it various desirable as well as undesirable operational features as a transient suppressor. For instance the recoverable spark gap (after it has fired) can easily by-pass the enormous energies associated with the lightning surge; however, during its commutation period (time required to ionize or "turn on" the spark gap) the transient appears unattenuated across the unprotected load. Also because of its limited power dissipation capability, the recoverable spark gap cannot by itself adequately dissipate the enormous energies in a direct lightning surge. Such a direct surge is one resulting from a lightning strike very near to the well head, as, for example, on the utility line within a few hundred feet of the well.

On the other hand the L-C filter can provide delay for a sharply rising transient voltage waveform but does not dissipate energy. Consequently the energy associated with the transient is later passed along to the load at the natural resonant frequency of the filter.

Varistors are reasonably fast and thus can quite effectively clip off the top of the transient voltage waveforms. However these devices can handle only relatively low energies and consequently provide no protection on a large transient.

Because of the enormous currents to ground resulting when the spark gap fires, if there is any resistance encountered in the ground return itself, extremely high voltages will develop between the spark gap ground and the distribution system ground. If that voltage is in parallel with the load, that high voltage will appear across the load terminals and the protection will have been lost even though the gap has fired. Since in the down hole pump situation, a ground return resistance will be present in virtually all applications, it will generally be necessary to utilize a first grounding circuit for the extremely high surge current of the spark gap and a second low current A.C. grounding circuit for the remainder of the device. Furthermore, where the dual grounding system is utilized, it is desirable that the two grounding circuits be spaced from each other and that the second grounding circuit not be located between the first grounding circuit and the distribution system grounding circuit, so that the voltage between these last two circuits will not be seen on the load.

With these features in mind the present invention incorporates all 3 types of existing surge suppressors into a 3 stage design. This design allows the elements to complement each other and interact constructively such that the overall performance achieved is far superior to that provided by any element individually.

BRIEF DESCRIPTION OF THE DRAWINGS

In drawings which illustrate preferred embodiments of the invention.

DETAILED DESCRIPTION

While the surge suppressor of the present invention is applicable to a wide variety of situations where protection against high voltage transients is required, the following detailed description is particularly applicable to the protection of rural oil well pumping stations and particularly to submergible pumps at those stations. A submergible pumping unit may be greater than 100 feet in length and only 4 inches in diameter. It operates up to 8000 feet below the surface of the earth at temperatures in the order of 200° F. and pressures of 3500 psi. Accordingly, such units offer unique problems in surge suppression which cannot be met by presently available commercial equipment. The surge suppressor of the present invention does provide transient protection for such units.

Figure 1:
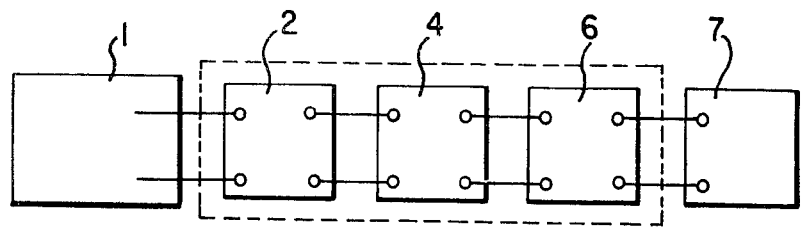
FIG. 1 is a block diagram illustrating the surge suppressor of the invention.

FIG. 1 is a block diagram showing the elements of the system under consideration. The element 1 is a power distribution system from which high voltage transients emanate from time to time. The element 7 is the electrical equipment being supplied by the system 1. Interposed between the distribution system 1 and the equipment 7, as shown within the discontinuous lines in FIG. 1, is the surge suppressor of the present case comprising the recoverable spark gap 2, the L-C filter 4 and the voltage variable resistor 6.

Figure 2:
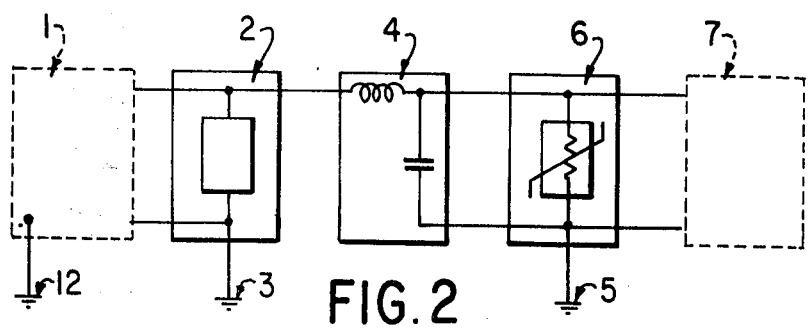
FIG. 2 is a circuit diagram of the invention.

In FIG. 2, the element 2 is a recoverable spark gap preferably in the form of an hermetically enclosed spark gap with a series nonlinear resistance. Such units are available commercially as standard lightning arrestors, for example, the Joselyn J9200. The lightning arrestor in the preferred embodiment should have about a 1000 RMS rating, the actual required rating in a specific application being determined by the operating voltage of the unit to be protected. The operational firing voltage of the arrestor establishes the minimum voltage for which the arrestor will provide protection. Below that voltage there may still be danger to equipment, and the other elements of the system must be relied upon to provide the additional protection.

The recoverable spark gap and its grounding circuit 3 dissipates most of the energy associated with a high voltage transient. However, its usefulness in the present situation depends critically upon the performance of the other two elements in the unit. Protection must be provided for the equipment at voltage levels generally between the operational firing voltage of the arrestor discussed above and the maximum starting transient on the equipment. Thus this maximum starting transient establishes the maximum voltage level which it is desirable to see at the equipment. It is desirable that transients above that level be smoothed out by the surge protection unit.

The second element in the unit, element 4 in FIG. 2, is an L-C filter. While many L-C filter arrangements known in the art would offer satisfactory performance, it is necessary from a practical economic viewpoint to attempt to optimize the system taking into consideration cost as well as performance.

Figure 3:
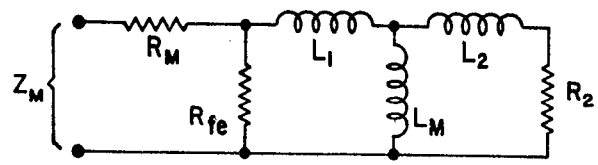
FIG. 3 is the equivalent circuit for one phase of the down hole pump motor.

Component selection for the L-C filter becomes a very difficult problem in the submergible pump situation because of interaction between a high Q filter and the complex variable impedance load. The equivalent circuit for one phase of these special down hole inductor moters is shown in FIG. 3. In series with this frequency dependent load is a long length (typically 6 to 8 thousand feet) of special lead-sheathed 3 phase feeder cable, having a shunt capacitance of about 90 pf. per foot. For a normal length of cable this gives $C_{line} \simeq 0.8 \mu f$ and $R_{line} \simeq 4.2 \Omega$. Thus the full A.C. equivalent circuit for one phase, including all filter, motor and line parameters, as well as the loading of the other two phases, is shown in FIG. 4.

The interaction of the high Q filter with this complex load results in a resonance effect over a range of frequencies. This effect is unavoidable in the down hole pump situation and results in a resonant amplification of any disturbance having frequency components within the range. This amplification can be in the order of a factor of 20 db or higher.

Therefore, in addition to normal cost and operation problems, component selection is required in this situation to take into account and attempt to minimize this resonance effect. Extensive computer modelling and analysis was undertaken to aid in this selection. It was unexpectedly discovered that optimum performance and cost effectiveness would result from the combination in an L-C filter half-section of a high current inductor and a large low loss capacitor. For optimum operation the inductor must have very low shunt capacitance and the capacitor must be ultra fast.

Figure 4:
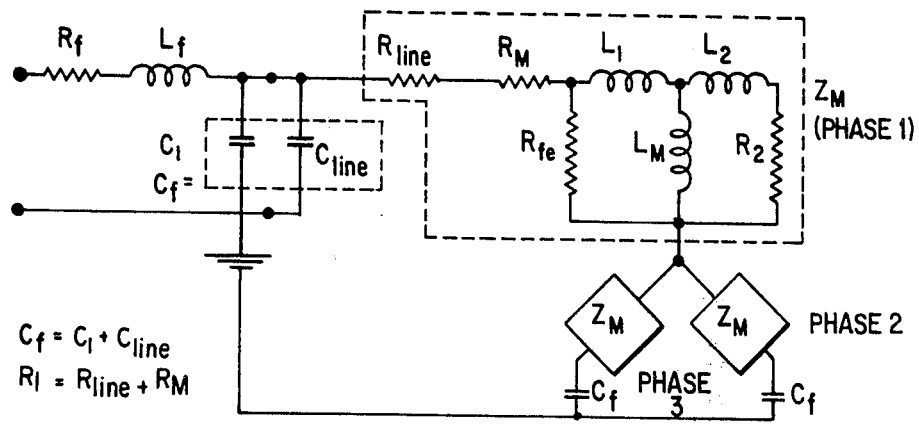
FIG. 4 is a equivalent circuit for one phase of the system including all line, filter and motor parameters and the loading from the other two phases.
Figure 5:
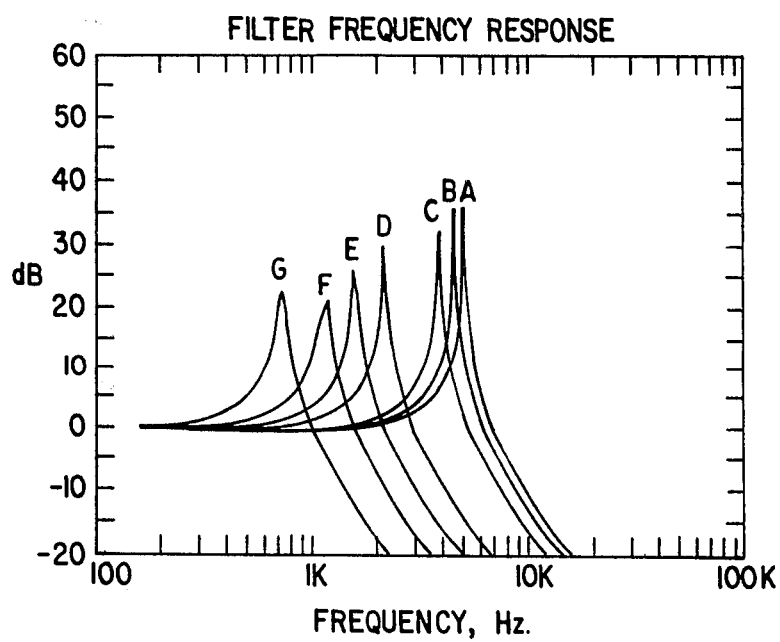
FIG. 5 illustrates a typical computer generated response based on analysis of the circuit of FIG. 4.
Figure 6:
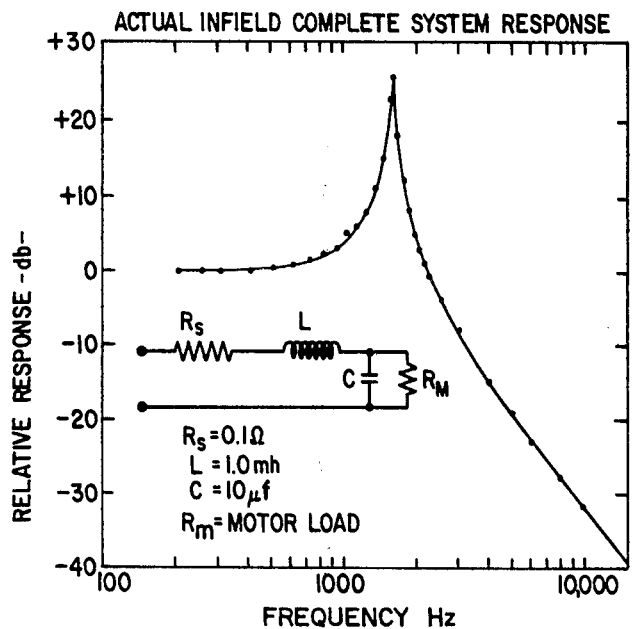
FIG. 6 illustrates the results of actual field testing of the response of the motor system.

Typical results of this computer analysis based on the equivalent circuit of FIG. 4 are given in FIG. 5. These clearly illustrate the effect of filter component selection on system cut off frequency and the resonant amplification phenomenon. Actual in field test results are shown in FIG. 6. The excellent correlation between the two figures validates the computer modelling and design approach used. A similar analysis would be necessary for different load parameters based on an appropriate equivalent circuit.

In order to obtain a sufficiently high Q with minimum shunt capacitance, the inductor was constructed with an air core and wound on a threaded mandrel to maintain a constant inter-turn clearance.

As an example, a suitable inductor for the preferred embodiment is a single layer 1 mh high current air core unit fabricated by winding about 200 turns of MHV wire onto a 6" I.D. $\times \frac{1}{4} \times 38"$ threaded dielectric former to a winding length of about 33". Wire size is chosen to accommodate the desired steady state AC power handling capacity with acceptable $I_2R$ loss. Thus the preferred wire size is #6 MHV for 50 amps and #4 MHV for 90 amps rms. The winding is locked in place by potting with Glyptol or other similar material. Oil circulation holes are distributed at top and bottom of the former. The inductor should have a rating of at least 0.5 mh and preferably 1 mh.

Other inductor configurations would be suitable to the invention, and the above detailed description has reference to a unit which is merely an example of one such configuration.

A suitable capacitor for the preferred embodiment is one of very low inductance and which is capable of continuously handling the reactive AC current.

Preferably, the capacitor should have a capacitance of at least 1 $\mu f$, and preferably at least 10 $\mu f$, and an inductance of about 10 nh or lower. The most preferred capacitance is about 20 $\mu f$. Power dissipation should be very low, such that, for example, a 20 year continuous duty lifetime can be expected. The capacitor should have an RMS voltage rating of 1.5 KV and be capable of operation at temperatures in the range of about $-40°$ C. to about 65° C.

Clearly, this description is simply a preferred embodiment for a specific set of conditions and variance is possible and acceptable depending on the particular application. However, the computer analysis for the down hole pump case suggests that the use of a 20 $\mu f$ unit is highly desirable. (FIG. 5)

The effect of the filter is to provide a time delay in a high voltage transient to allow time for the spark gap to ionize and fire. Typically, the delay should be at least about 10 $\mu s$. The filter also provides some attenuation for lower voltage surges which are insufficient to fire the spark gap. By way of example, for the particular lightning arrestors and filter described in detail above, an attenuation of about 20 db is provided for surges below about 9 KV.

The filter should have a low frequency cut off of less than about 2 KHZ.

The element 6 in FIG. 2 is a high voltage metal oxide variable voltage resistor (varistor) connected in shunt across the filter output, preferably having at least one bleeder resistor connected across the voltage variable resistor. The functions of this element are twofold. First, it will "clip" any transient that manages to get through the spark gap and the L-C filter. This can occur for fast rising lower voltage transients which, as noted above, are generally too small to fire the spark gap, but which, if not smoothed out, could damage the load. Such a clipping action would occur, for example, on the surges below about 9 KV discussed just above. Since the starting transient level of equipment being protected is generally higher than the operating voltage, it is the starting transient which is used to determine the level above which the varistor clipping action must occur.

Second, the varistor unit serves to remove spikes caused by the resonance effect noted above.

Again, the varistor is required to have a 1000 V RMS rating in the preferred embodiment for the deep well pump case. It is satisfactory to use lower rated units in series. The most preferred combination is to use two 480 volt units in series. These have a sufficiently low firing point to avoid pre-firing damage to the load.

A separate ground connection for the filter and varistor is illustrated at 5.

As indicated above, an additional problem arises where the resistance of the ground return path is other than zero. It has been found in practice that the ground resistance is virtually always other than zero and is typically in the range of 8 to 10 ohms. In the submergible pump case the well casing along with the salt water which is invariably present in the well provides an excellent ground which, if utilized, could normally avoid this ground resistance problem. Unfortunately, the surge protection unit cannot normally be grounded through the well casing because of the effect on corrosion protection systems. It is therefore generally the case that the unit must be grounded through a measureable ground resistance often of the order of 8 to 10 ohms.

Since the surge current to ground from the lightning arrestor may be in the order of 100,000 amps or more, a voltage drop is produced across this ground resistance which momentarily causes the grounding system to rise to essentially the full impulse voltage. Prior to dissipation of the surge energy, this voltage appears across the return line. The net result of this sequence of events is that the motor windings and the inner conductors of the feeder cable are momentarily subjected to nearly the full transient voltage, but the well grounded motor housing and cable lead sheath remain held solidly at ground potential by the bore casing and salt water in the hole. This situation results in a very high voltage stressing of the motor winding and cable insulation and consequently usually leads to failure of either or both of these components.

An acceptable solution to this difficulty has been developed and comprises utilization of two separate grounding circuits; the first, a high surge current ground, and the second, a low current A.C. ground. This circuit configuration is shown for 3 phases in FIG. 7.

In the installation of this embodiment of the device, it is necessary that the two ground connections, generally two grounding rods, be separated by a distance in the order of several feet. Furthermore, the low current A.C. ground must not to be located within the ground return current path of the high surge current ground. This generally means that the low current A.C. ground ought not to be located between the high surge current ground and the power distribution line ground of the utility company. Otherwise, a potential divider effect can occur and the protection feature will again be lost.

Figure 7:
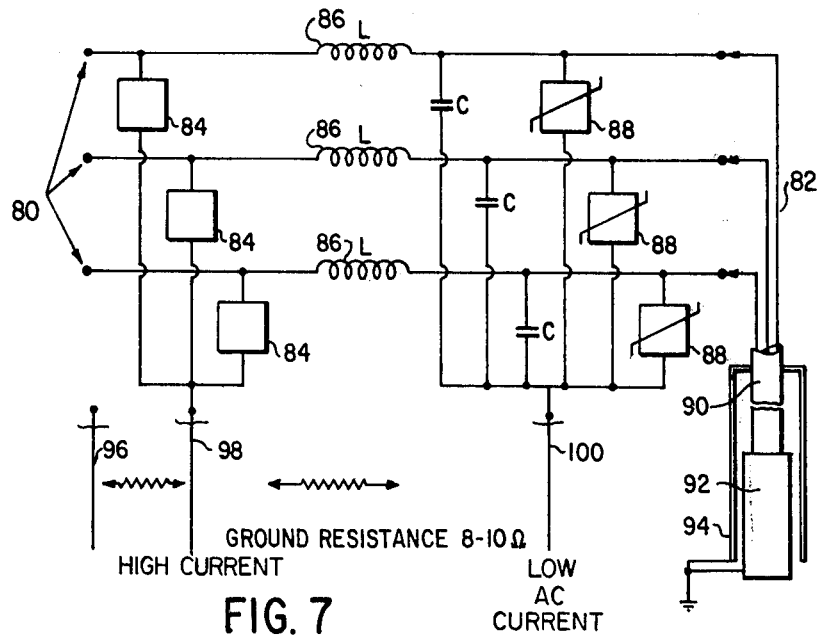
FIG. 7 illustrates the dual grounding system of the present invention.

A preferred layout for the dual grounding system is illustrated in FIG. 7. The three terminals 80 represent the inputs to the suppressor; and the three terminals 82, the outputs. The arrestors 84, the filters 86 and the varistors 88 are shown for the three phases. In addition the figure illustrates the motor feeder cable 90, the motor 92 and the well casing 94. The dual grounding system is illustrated by a high surge current ground 98 from the arrestors and a low current A.C. ground 100 from the filters and varistor. The utility line ground is illustrated at 96. As suggested above, grounds 98 and 100 are separated by a distance which, for optimum performance, will be in the order of several feet. Furthermore, as illustrated, the ground 100 ought not to be located bewtween grounds 96 and 98.

A very advantageous side effect of the use of the separate grounding systems is that the ground resistance can be utilized to dissipate a large portion of the surge energy. The energy dissipation requirement of the lighting arrestors of the first stage can then be very substantially reduced. The commercially available single arrestor of 1 kilojoule rating can then be utilized.

The ground resistance between grounds 96 and 98 is almost always a measureable amount and typically in the order of 8 to 10 ohms. As discussed above, this factor, combined with the extremely high current to ground when the spark gap fires, necessitates the separate grounding system.

Figure 9:
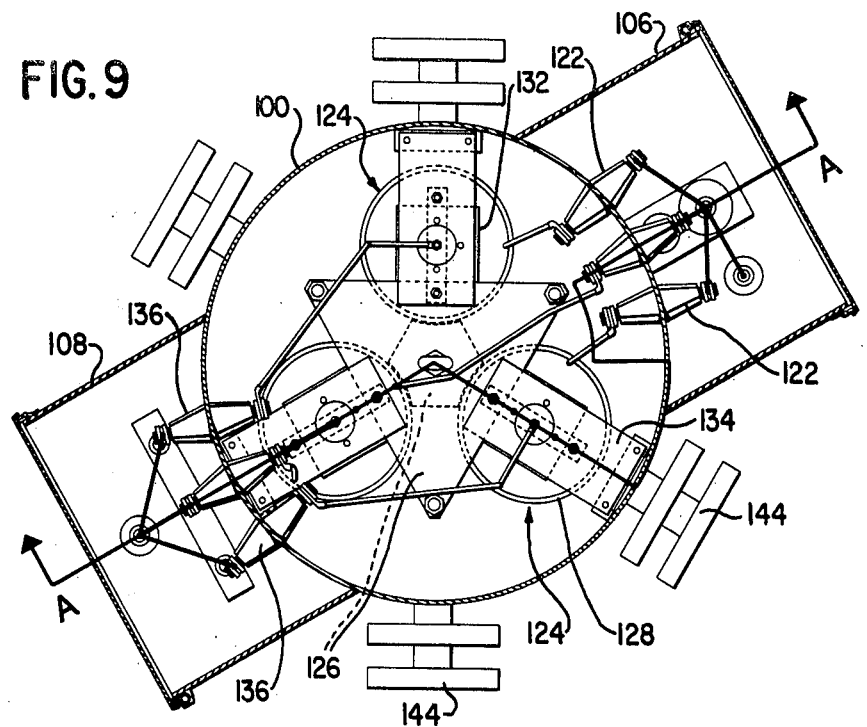
FIG. 9 illustrates a plan view of the layout of FIG. 8.
Figure 8:
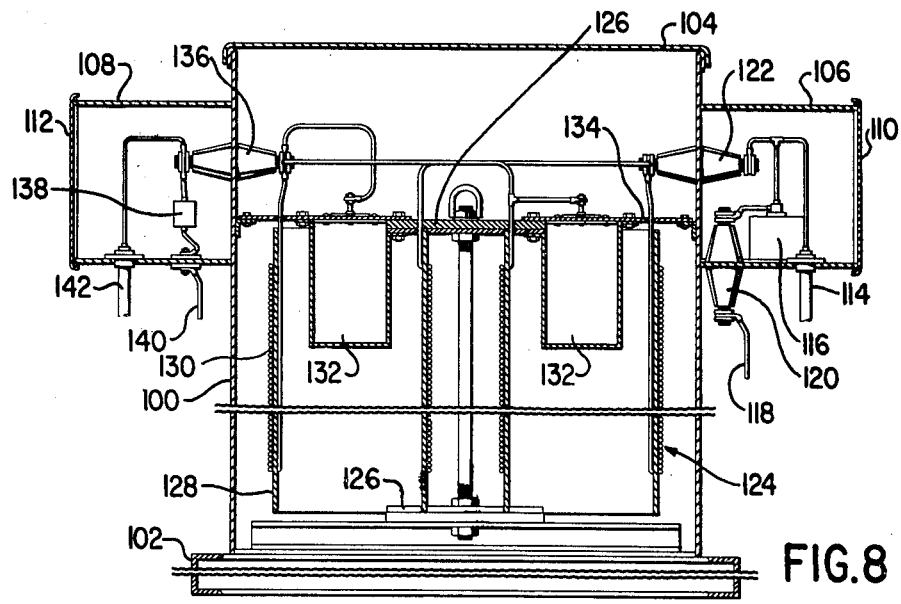
FIG. 8 illustrates in sectional elevation a preferred physical layout of the suppressor of the invention.

A preferred physical layout of the components of the complete surge suppressor is illustrated in FIGS. 8 and 9.

The unit is housed in a metal cylinder 100 fixed to a base 102 and having a weatherproof cover 104. Connection boxes 106 and 108 are fixed to the sides of cylinder 100 and are provided with weatherproof covers 110 and 112.

The three phase input 114 enters the unit via the connection box 106. The three phase lightning arrestor 116 with an incorporated series resistance is located is connection box 106. The high surge current ground 118 exits connection box 106 through the high voltage insulated feed throughs 120. Three phase power enters cylinder 100 through high voltage insulated feed throughs 122.

Within cylinder 100 the inductors 124 are mounted on dielectric brackets 126. Inductors 124 include the formers 128 and the windings 130. While it may not be entirely clear in the drawing, the formers 128 are preferably threaded and the windings 130 are fixed in the thread grooves to ensure that a spacing is maintained between the turns in the windings.

The capacitors 132 are mounted in brackets 134 and are located within the corresponding windings 130. Since the physical size of the unit very materially affects the cost of production, it is advantageous to maintain as compact a structure as possible, subject to performance requirements.

Three phase power exits the filter component and the cylinder 100 through high voltage insulated feed throughs 136 to connection box 108.

The varistors 138 (one for each phase) are mounted in connection box 108 and lead to the low current A.C. ground 140.

Three phase power exits the connection box 108 at 142 and is then conducted to the protected load.

To provide cooling for the inductors 124 as well as to provide high voltage insulation, the cylinder 100 is filled to the level of brackets 134 with high voltage transformer oil. The external fins 144 are preferably provided for oil cooling.

TEST CIRCUIT AND PROCEDURE

Figure 10:
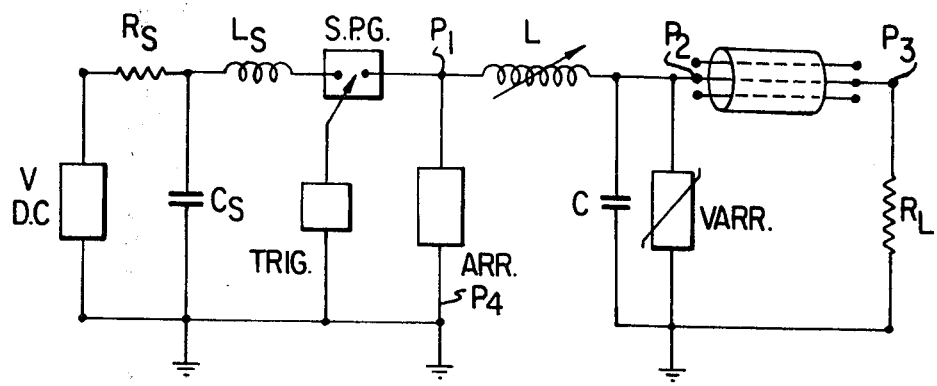
FIG. 10 illustrates a test circuit utilized in evaluating the invention.

A test circuit for evaluation of the surge suppressor was set up as shown in FIG. 10. The explanation of symbols on the figure is as follows:

| | |
|---|---|
| $V_{D.C.}$ | D.C. Variable voltage power supply (0–50 KV at 5 ma) |
| $C_s$ | surge storage capacitor (Maxwell 0.75 $\mu f$ at 60 KV) |
| $L_s$ | surge inductor to control transient rise time ($-20\ \mu h$) |
| S.P.G. | pressurized spark gap to act as switch for transient application |
| Trig | trigger generator to repetitively fire the transient source |
| Arr | secondary lightning arrestor (Joselyn and/or McGraw Edison) |
| L | high Q filter inductor (initially of variable value) $L_{min} \approx .9$ mh (air core) $L_{max} \approx 4.1$ mh with full core |

Inductor initially #7 MHV wire wound on 6"ID×¼" wall perspex tube. Wire wound in threaded groove to give ≈0.010" air gap between turns. Overall length ≈28 inches.

| | |
|---|---|
| C | filter capacitor (Maxwell 0.75 μf at 10 nh, 60 KV) |
| Varr | varistor 575,650 & 1000 volt units (General Electric) typical GE MOV 575 LB 80. (80 joules dissipation). |
| $C_a$ | 3 phase flat feeder cable ≈ 6 ft. |
| $R_s$ | surge source charging resistor ≈ ½ mΩ. |
| $R_L$ | simulated motor load, 50Ω → 280Ω inductive (wire wound). |
| Test Points | |
| $P_1$ | |
| $P_2$ | oscilloscope observation points using high voltage Tektronix probes and 556 dual beam Tektronix oscilloscope |
| $P_3$ | |
| $P_4$ | current monitoring position using Pearson *impulse transformer. |

*indicates trade mark or trade name throughout disclosure.

The test circuit was repetitively pulsed by means of the triggered spark gap. Wave-forms were observed at the test points noted above. Various oscilloscope traces were photographed under specific charging voltage conditions so as to determine the effectiveness of the surge suppressor as a function of the transient amplitude and energy. A tektronixoscilloscope camera was used to record wave-forms on ASA 3200 Polaroid* roll film.

Tests were run with various combinations of the circuit elements in order to evaluate the contribution of individual elements as well as the performance of the unit as a whole.

EXAMPLE 1

Figure 11:
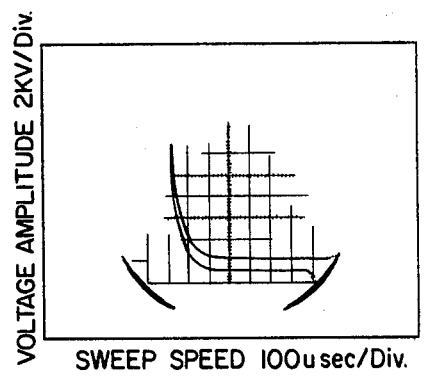
FIGS. 11 to 22 illustrate the result of lab testing of the invention using the circuit of FIG. 10.

Initially the circuit was tested with no suppressor elements in the circuit with a D.C. charging voltage of 12 KV. The oscilloscope trace was photographed at test point $P_2$ across the load $R_L$. The trace is shown in FIG. 11.

The trace shows that without the surge suppressor in the circuit the entire impulse charging voltage appears across the load R (which is used here to simulate the down hole motor). An extremely fast rise time was noted for the transient.

EXAMPLE 2

The circuit was then tested with the filter included but with the arrestors and the varistors excluded. The following test parameters were utilized.

| | |
|---|---|
| $V_{D.C.}$ | 12 KV charging |
| L | 4 mh |
| C | 0.75 μf |
| Test Point | $P_2$ |

Figure 12:
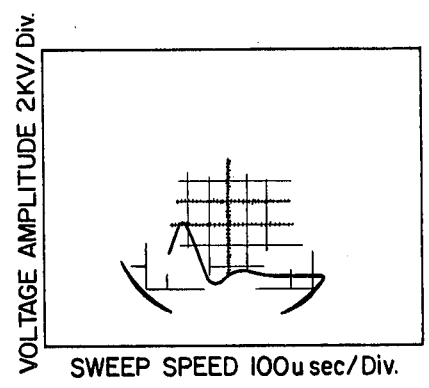

The trace is shown in FIG. 12. As can be seen, a very large impulse spike still appears across the load when only the filter section of the suppressor is used. However the spike amplitude has been considerably reduced (≈½) and it also has a much slower rise time. The amplitude of the surge spike on the load is approximately 4.5 KV when the full surge charging voltage $V_{D.C.}$ is 12 KV.

EXAMPLE 3

The circuit was next tested with the filter and the arrestor included, but excluding the varistors. The following test parameters were utilized:

| | |
|---|---|
| $V_{D.C.}$ | 12 KV charging |
| L | 4 mh |
| C | 0.75 μf |
| Arr | 650 V (McGraw Edison) |
| Test Point | $P_2$ |

Figure 13:
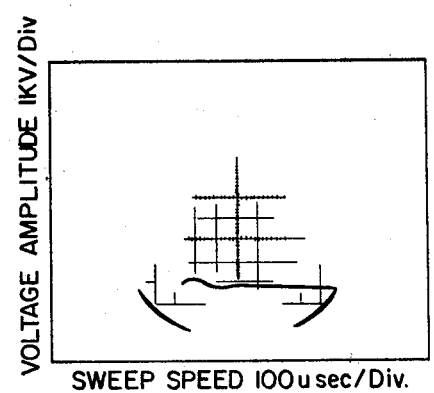
Figure 14:
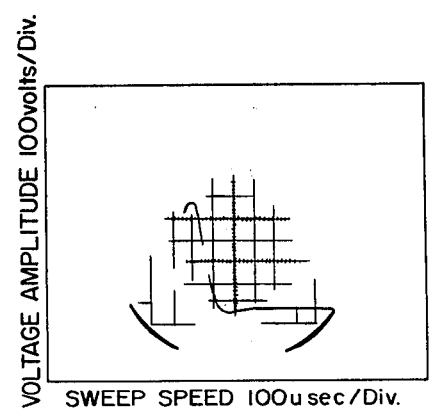

The trace for this test is shown in FIG. 13 and on an expanded vertical scale in FIG. 14. From these figures it can be seen that the arrestor has had a profound influence on the transient coupled through the load. This effect, which is particularly noticeable by comparing FIG. 13 with FIG. 12, clearly indicates that the filter has provided sufficient time delay and isolation for the arrestor to "turn on" and dissipate most of the energy in the transient. The expanded scale in FIG. 14 shows that the surge spike reaching the load has been reduced in amplitude to about 550 volts, even though the input surge amplitude to the suppressor is 12 KV.

EXAMPLE 4

This example illustrates the effect of the complete suppressor unit including filter, arrestor and varistor. The following test parameters were utilized.

| | |
|---|---|
| $V_{D.C.}$ | 12 KV charging |
| L | 4 μh |
| C | 0.75 μf |
| Arr | 650 V. (McGraw Edison) |
| Var | MOV 130 L 20 (General Electric) |
| Test Point | $P_2$ |

Figure 15:
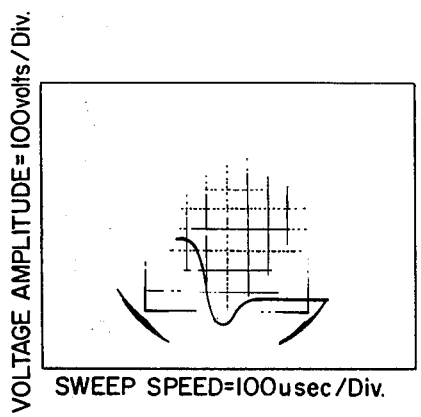

The trace for this test is shown in FIG. 15. The trace indicates that the varistor has clamped the voltage spike appearing across the load R to about 350 volts. (Note expanded scale and compare with FIG. 14). This is so since the varistor used is a 120 volt variety which is completely turned on at about 350 volts.

EXAMPLE 5

This example comprises two tests to further illustrate the effect of the varistor. In the first case, the circuit included the filter and the varistor; in the second case, the filter only. In both cases the arrestor was excluded. The parameters for both tests were as follows:

| | |
|---|---|
| $V_{D.C.}$ | 12 KV charging |
| L | 4 mh |
| C | 0.75 μf |
| Varr | G.E. MOV 420 LR 40 |
| Test Point | $P_2$ |

Figure 16:
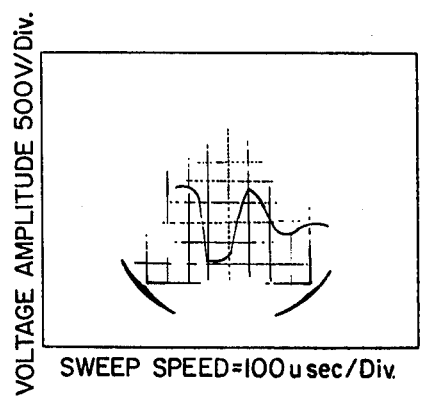
Figure 17:
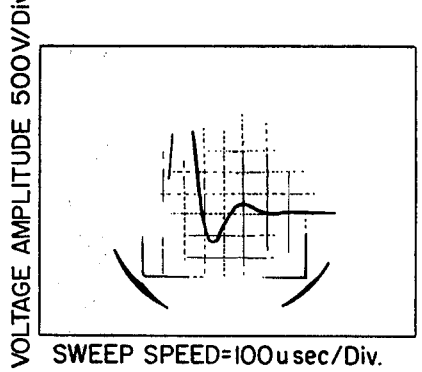

The traces for the tests are shown respectively in FIGS. 16 and 17. A comparison of the traces in the two Figures shows that the varistor is very effective in clipping the peak amplitudes of the transient spikes that manage to get through the filter.

EXAMPLE 6

In this example the complete suppressor including all three elements was tested at a higher voltage. Parameters were as follows:

| | |
|---|---|
| $V_{D.C.}$ | 24 KV charging |
| L | 4 mh |
| C | 0.75 µf |
| Arr | 650 V (McGraw Edison) |
| Var | G.E. MOV 420 LB 40 |
| Test Point | $P_2$ |

Figure 18:
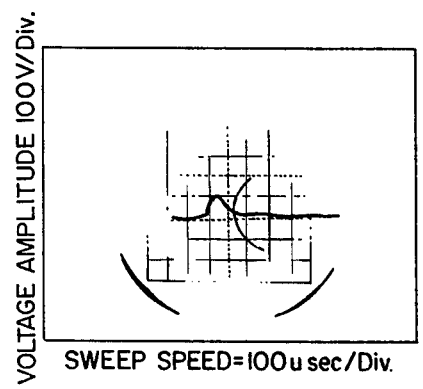

The trace for this test is shown in FIG. 18. Comparison of FIG. 18 and FIG. 15 reveals that a considerably smaller transient spike appears across the load when the amplitude of the input transient has been increased. This aspect is explained in terms of a better "turn on" of the lightning arrestor at higher input voltages.

EXAMPLE 7

This example again included the complete suppressor unit but utilized a still higher input voltage. Parameters were as follows:

| | |
|---|---|
| $V_{D.C.}$ | 40 KV charging |
| L | 4 mh |
| C | 0.75 µf |
| Arr | 650 V (McGraw Edison) |
| Var | G.E. MOV 420 LB 40 |
| Test Point | $P_2$ |

Figure 19:
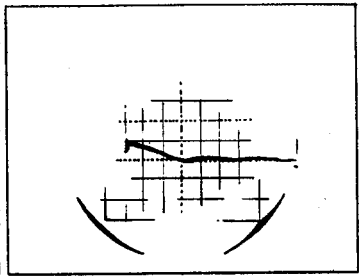

The trace for this example is shown in FIG. 19. Examination of FIG. 19 and other similar oscilloscope traces taken over the voltage range of 12 to 40 KV clearly indicated that the suppressor work even better at higher impulse voltage. This is due to the fact that the arrestor "fires better" at higher voltages. It was also found that the arrestors fire erratically at impulse voltages below about 9 KV. Consequently it is necessary to have the varistors across the load as additional protection against low voltage transients.

All of the above examples were run on a single phase transient suppressor in the laboratory. Further tests were then run using a prototype 3 phase unit constructed as illustrated in FIG. 7 and described above. The test circuit was the same as that utilized the initial laboratory tests described above.

In each of the three tests illustrated below the complete suppressor was utilized, in this case in an oil filled container. The specifications for the prototype elements were as follows:

| | |
|---|---|
| $V_{D.C.}$ | variable as specified below for individual examples |
| L | 1 mh |
| C | 20 µf |
| Arr | Joselyn J9200-7 650V. (2 in series) |
| Var | G.E. MOV 575 LB 80 575V 80j (2 in series) |
| Test Points: | |
| $P_1$ | suppressor input |
| $P_3$ | suppressor output |

EXAMPLE 8

Figure 20:
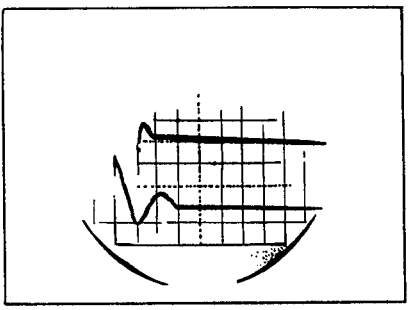

A test was run at a voltage $V_{D.C.}$ of 12 KV charging. The resulting traces are illustrated in FIG. 20 wherein (1) the lower trace (10 KV/DIV, 5 µsec./Div) represents the $P_1$ voltage, the input to the suppressor, and (2) the upper trace (20 V/Div, 200 µsec/Div.) represents the $P_2$ voltage, the output from the suppressor.

EXAMPLES 9, 10

Figure 21:
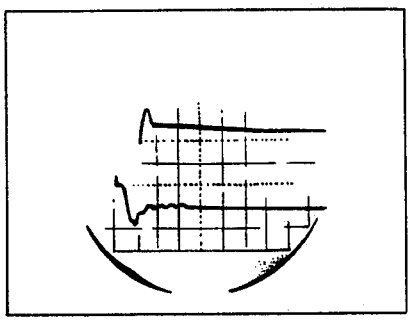
Figure 22:
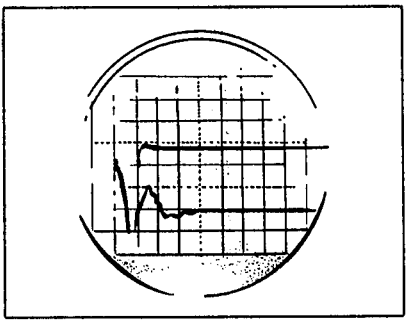

The test of example 8 was repeated in examples 9 and 10 but with the input voltage at 18 KV and 40 KV respectively. The results are traced in FIGS. 21 and 22 respectively with in each case the lower trace representing the input to the suppressor and the upper trace, the output.

In each case the impulse was applied to one phase at a time with comparable results each time.

A comparison with the bench model tests of examples 4, 6 and 7 shows that the prototype gave improved results over the bench model. This was expected in view of the larger L-C product used here, as discussed above.

These test results indicate that the unit will operate very effectively in a situation where grounding does not present a difficulty. Such a situation could be achieved if the wellhead and bore casing could be used as a ground connection. Since corrosion protection equipment dictates that this manner of grounding not be used, it was necessary to develop the new dual grounding system of the invention.

As indicated above, it became apparent in the course of this additional research that the new grounding system could be utilized to dissipate a large part of the energy associated with large surges such as those arising from lightning strikes. The rating of the lightning arrestor could therefore be cut to the extent that a single 1000 volt arrestor would suffice for the separate high current ground.

The overall test results indicate that a very effective surge protection unit for the purposes stated has been achieved.

While the invention has been described in detail in respect of the preferred embodiments, it will be understood that it is not intended to limit the invention to those embodiments. On the contrary it is intended to cover all alternatives, modifications and equivalents as may be included within the spirit and scope of the present invention.

What I claim as my invention:

1. A high voltage transient protection unit for connection between a power source and a load comprising:
   a recoverable spark gap electrically connected to the power source,
   an L-C filter electrically connected to said recoverable spark gap; and
   a voltage variable resistor electrically connected to said L-C filter and to the load; and
   a first means for connecting said recoverable spark gap to a first grounding circuit; and
   a second means for connecting said filter and said voltage variable resistor to a separate and distinct grounding circuit.

2. A high voltage transient protection unit for connection between a power source and a load comprising a recoverable spark gap means connected to receive power from said power source, said recoverable spark gap means operating to shunt voltage transients above a first predetermined voltage level, a high surge current ground means connected to receive transients shunted by said recoverable spark gap means, L-C filter means connected to said recoverable spark gap means and operative to delay high voltage transients for a delay period sufficient to permit said recoverable spark gap means to operate to shunt transients above said first predetermined voltage level to said high surge current ground means, voltage variable resistance means connected between said L-C filter means and said load, and a low current A.C. ground means connected to said L-C filter means and said voltage variable resistance means, said low current A.C. ground means being separate and distinct from said high surge current ground means, said voltage variable resistance means operating with said L-C filter means to filter to said low current A.C. ground means that portion of a voltage transient between a second predetermined voltage level and said first predetermined voltage level, said second predetermined voltage level being lower than said first predetermined voltage level.

3. The unit of claim 2 wherein the recoverable spark gap means includes at least one hermetically enclosed spark gap with a series nonlinear resistance.

4. The unit of claim 3 wherein said at least one hermetically sealed spark gap is a lightning arrestor.

5. The unit of claim 2 wherein the total rating of said recoverable spark gap means is about 1000 V RMS.

6. The unit of claim 2 wherein the L-C filter means includes an L-C filter half section including a high current inductor and a large low loss capacitor.

7. The unit of claim 6 wherein said inductor has a rating of at least 0.5 mh.

8. The unit of claim 6 wherein the said inductor has a rating of at least 1 mh.

9. The unit of claim 6 wherein the said inductor has a rating of 1 mh.

10. The unit of claim 6 wherein the capacitor has a rating of at least 1 µf.

11. The unit of claim 6 wherein the capacitor has a rating of at least 10 µf.

12. The unit of claim 6 wherein the capacitor has a rating of 20 µf.

13. The unit of claim 6 wherein the said inductor has a very low shunt capacitance.

14. The unit of claim 6 wherein the said capacitor is ultra-fast.

15. The unit of claim 6 wherein the said inductor has a rating of 1 mh and said capacitor has a rating of 20 µf.

16. The unit of claim 6 wherein the low frequency cut-off of the said filter is less than about 2 KHZ.

17. The unit of the claim 6 wherein the said filter gives at least about 20 db attenuation for lower voltage transients below about 9 KV.

18. The unit of claim 2 wherein the said voltage variable resistor means includes at least one high voltage metal oxide variable voltage resistor.

19. The unit of claim 18 wherein said variable voltage resistor is connected in shunt across the filter means output.

20. The unit of claim 18 wherein the unit includes at least one bleeder resistor connected across said voltage variable resistor.

21. The unit of claim 18 wherein said voltage variable resistor means includes two high voltage metal oxide varistors connected in series.

22. The unit of claim 21 in which each of said varistors has a rating of about 480 volts.

23. The unit of claim 21 wherein a bleeder resistor is connected across each of said varistors.

24. The unit of claim 2 wherein each said high surge current ground means and low current A.C. ground means includes at least one grounding rod.

25. The unit of claim 24 wherein said at least one grounding rod of said first circuit is spaced from said at least one grounding rod of said second circuit.

26. The unit of claim 25 wherein said rods are separated by a distance of at least 4 feet.

27. The unit of claim 24 wherein said at least one grounding rod of said low current AC ground means lies out of the ground return path of said high surge current ground means.

28. A method of protecting electrical equipment from damage due to high voltage transients in a power distribution line comprising:
(a) directing any transient above a predetermined minimum voltage level through a recoverable spark gap to a first grounding circuit;
(b) delaying said transient for a sufficient time to allow said spark gap to fire; and
(c) removing that portion of said transient below said predetermined minimum level and above a predetermined maximum voltage by directing said portion of said transient into a second separate grounding circuit level.

29. The method of claim 28 wherein said minimum level is about 9 KV.

30. The method of claim 28 wherein said minimum level is the minimum level at which said spark gap will fire.

31. The method of claim 28 wherein said predetermined maximum level is below the voltage level at which damage to said electrical equipment would result.

32. The method of claim 28 wherein said predetermined minimum voltage level is established by the operational firing voltage of said spark gap.

33. The method of claim 28 wherein said predetermined maximum voltage level is established by the starting transient level of the said equipment.

34. The method of claim 28 wherein said delaying is for a period of at least about 10 µs.

35. A high voltage transient protection unit for connection between the power source of a power distribution system having a distribution system ground and a variable impedance load having a maximum starting transient voltage level comprising a recoverable spark gap means connected to receive power from said power source, said recoverable spark gap means operating to shunt transients above a first predetermined voltage level greater than the maximum starting transient voltage level of said variable impedance load, a high surge current ground means connected to receive transients shunted by said recoverable spark gap means, a high Q L-C filter means connected to said recoverable spark gap means and operative to delay high voltage transients from said power supply for a delay period sufficient to permit said recoverable spark gap means to operate to shunt transients above said first predetermined voltage level to said high surge current ground means, voltage variable resistance means connected between said high Q L-C filter means and said variable impedance load, said voltage variable resistance means operating to clip voltage transients from said high Q L-C filter means at a voltage level which is no higher than the maximum starting transient voltage level of said variable impedance load, and a low current A.C. ground means connected to said high Q L-C filter means and to said voltage variable resistance means, said low current A.C. ground means being separate and distinct from said high surge current ground means.

36. The high voltage transient protection unit of claim 35 wherein said low current A.C. ground means is located so as not to be between said distribution system ground and said high surge current ground means.

* * * * *